United States Patent [19]
Arjunan et al.

[11] Patent Number: 6,111,019
[45] Date of Patent: Aug. 29, 2000

[54] LLDPE BLENDS WITH AN ETHYLENE-NORBORNENE COPOLYMER FOR RESINS OF IMPROVED TOUGHNESS AND PROCESSIBILITY FOR FILM PRODUCTION

[75] Inventors: Palanisamy Arjunan, Houston, Tex.; Wai Yan Chow, Tianjin, China; Bruce Allan Harrington, Houston, Tex.; Yu Feng Wang, Houston, Tex.; Henry Yang, Houston, Tex.

[73] Assignee: Exxon Chemical Patents, Inc., Baytown, Tex.

[21] Appl. No.: 08/831,510

[22] Filed: Mar. 31, 1997

[51] Int. Cl.$^7$ .............................. C08L 23/06; C08L 45/00
[52] U.S. Cl. ............................................. 525/211
[58] Field of Search ............................................. 525/211

[56] References Cited

U.S. PATENT DOCUMENTS

| | | | |
|---|---|---|---|
| 2,934,527 | 4/1960 | McKay et al. | 526/281 |
| 5,055,438 | 10/1991 | Canich | 502/117 |
| 5,087,677 | 2/1992 | Brekner et al. | 526/160 |
| 5,168,111 | 12/1992 | Canich | 526/160 |
| 5,225,503 | 7/1993 | Sagane et al. | 526/169.2 |
| 5,272,235 | 12/1993 | Wakatsuru et al. | 526/281 |
| 5,324,801 | 6/1994 | Brekner et al. | 526/160 |
| 5,359,001 | 10/1994 | Epple et al. | 525/97 |
| 5,552,504 | 9/1996 | Bennett et al. | 526/348.1 |
| 5,629,398 | 5/1997 | Okamoto et al. | 526/281 |

FOREIGN PATENT DOCUMENTS

| | | |
|---|---|---|
| 2115196 | 2/1994 | Canada . |
| 0 504 418 A1 | 9/1992 | European Pat. Off. . |
| 0501 370 A1 | 9/1992 | European Pat. Off. . |
| 214 137 | 10/1984 | Germany . |

OTHER PUBLICATIONS

Patent Abstracts of Japan, #06271716, Dec. 26, 1994, vol. 18, No. 686 (C–1292).
Patent Abstract—DD–214137 Buehler, K., Oct. 30, 1984.

*Primary Examiner*—Christopher Henderson
*Attorney, Agent, or Firm*—William G. Muller; Frank E. Reid

[57] ABSTRACT

This invention is for LLDPE blends with an ethylene-norbornene copolymer for resins and improved toughness and processibility for film production. This invention provides LLDPE based resins which are significantly improved with respect to their capability to be fabricated into a film layer, particularly by a blown bubble extrusion technique. Films prepared of the LLDPE/E-NB melt blended resins of this invention are significantly improved with respect to certain of their film properties, such as tear strength, without detracting from the beneficial properties that a LLDPE otherwise provides to a film.

13 Claims, 1 Drawing Sheet

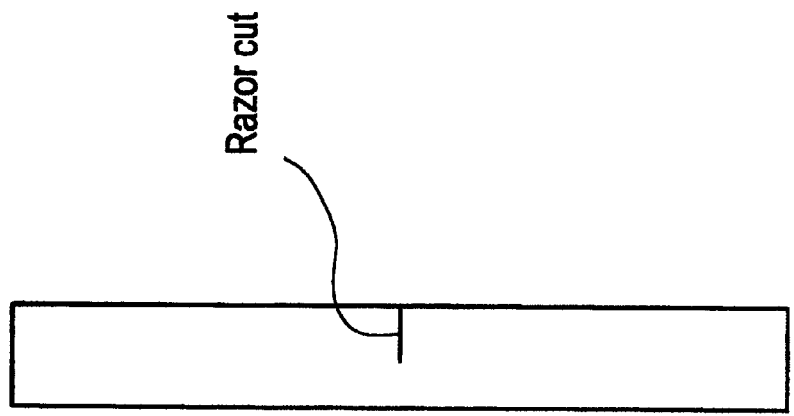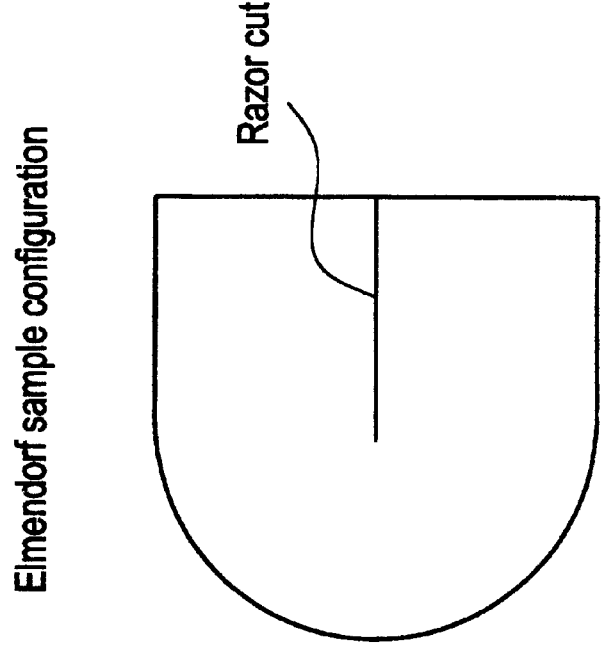
FIG. 1A  Elmendorf sample configuration — Razor cut
FIG. 1B  Notched strip sample configuration — Razor cut

LLDPE BLENDS WITH AN ETHYLENE-NORBORNENE COPOLYMER FOR RESINS OF IMPROVED TOUGHNESS AND PROCESSIBILITY FOR FILM PRODUCTION

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

Polyolefins and other polymer types may be fabricated into films by either of two general film forming techniques. Molten polymer may be extrusion cast through a slot die to form a film layer, and films so formed are generally referred to as cast films. Or, molten polymer may be extruded through an annular die to form a gas tight enclosure of the extrudate which is then blown filled with air to expand the extrudate into an air supported film bubble, and films so formed are generally referred to as blown bubble films.

The technique of forming polymer resins into films by a blown bubble extrusion technique is widely practiced and presents various processing simplifications and conveniences compared to that of film formation by slot die extrusion casting techniques. However, to successfully practice film formation by a blown bubble extrusion technique, the polymer resin of which the film layer is to be formed must possess certain minimum physical/mechanical properties, chief of which is a strength at its extrusion temperature (i.e., "melt strength") sufficient to support formation of a film bubble during its blowing and expansion by air.

Heretofore certain types of polymer resins that otherwise possess physical/mechanical/chemical properties that are desirable in a film for various end uses, have presented melt strength properties that render such resins problematic for production into films by a blown bubble extrusion technique. One such type of problematic polymer resin is that of linear low density polyethylenes. A linear low density polyethylene, conventionally referred to as LLDPE, is a copolymer of ethylene with a minor quantity of an olefinic hydrocarbon comonomer, typically a acyclic $C_3$–$C_8$ alpha-olefin, such that ethylene comprises at least about 80 wt. % of the polymer whereas the comonomer content comprises less than about 20 wt. % of the polymer mass. Copolymerization of ethylene with such minor quantities of acyclic olefinic hydrocarbon comonomer introduces short chain branching along the polymer backbone to yield an ethylene based polymer having a density in the range of about 0.910 to about 0.940 g/cm$^3$, with lower densities associated to higher comonomer contents and higher densities associated to lower comonomer contents. An LLDPE thus possesses many mechanical/chemical property attributes that are similar to a highly branched low density homopolyethylene produced by high pressure free radical polymerization while also possessing certain mechanical/chemical and rheological properties like that of a high density linear homopolyethylene produced by low pressure Ziegler-Natta polymerization processes. Hence, this high ethylene content ethylene-alpha-olefin copolymer is referred to as a linear low density polyethylene; namely, LLDPE.

LLDPEs are employed as such, or as a component in blend with yet other polymers, for the formation of films which are designed for a variety of end use purposes, like films for the consumer market such as household disposable, trash bags and liners; overwrap films and bags for laundry and dry cleaning goods; and shipping and carryout bags for retain merchandising. LLDPE is desirable as a resin for films of such end use designs because of its relatively low cost compared to other resin types such as polyvinylchloride, etc. and because it possesses in combination with this low cost an excellent set of mechanical/physical/chemical properties such as tensile strength, secant modulus, tensile tear strength, puncture resistance, elongation at break, etc.

To this end, LLDPE resins have heretofore been extruded into film layers by both film forming techniques—slot die casting and blown bubble extrusion techniques. However, due to the relatively low melt strength and relatively low dynamic viscosity under low shear rates of an LLDPE resin compared to other polymer types, an LLDPE is more difficult to use as such for fabrication into a film layer by the blown bubble extrusion technique. Hence, when a LLDPE resin is used in a blow bubble extrusion technique for film formation, the processing conditions must be more carefully controlled within a narrower window of operating conditions and certain limitations must be observed upon the dimensions to which the film layer of a LLDPE can be produced, particularly that of its film thickness. Such limitations that must be observed with an LLDPE as utilized in a blown bubble extrusion technique for film formation further limit the rate of film production compared to that at which other types of polymer could be produced to film by a blown bubble extrusion technique.

BRIEF SUMMARY OF THE INVENTION

This invention provides LLDPE based resins which are significantly improved with respect to their capability to be fabricated into a film layer, particularly by a blown bubble extrusion technique. The LLDPE based resins of this invention comprises a melt compounded blend of 70–90 wt. % of a LLDPE resin with from 10–30 wt. % of an ethylene-norbornene copolymer (E-NB) having a norbornene content of $\geq$10 mole % and $\leq$20 mole % and a glass transition temperature ($T_g$) less than 60° C. In accordance with this invention, the LLDPE component is melt blended under high shear conditions with a quantity of the ethylene-norbornene copolymer (E-NB) component so as to yield a melt blended composite resin having a norbornene content of >1 mole % and <10 mole % and preferably a norbornene content $\geq$2 and $\leq$6 mole %. Such LLDPE/E-NB melt blended resins are significantly improved with respect to their processibility and toughness for the production of film layers, particularly for the production of film layers by a blown bubble extrusion technique, and thereby overcome the processibility/toughness deficiencies inherent in a LLDPE for film production. Further, it has been found that films prepared of the LLDPE/E-NB melt blended resins of this invention are significantly improved with respect to certain of their film properties, such as tear strength, without detracting from the beneficial properties that a LLDPE otherwise provides to a film.

Accordingly, the subject matter of this invention is the LLDPE/E-NB melt blended resin and films produced thereof wherein at least one film layer thereof is comprised of the LLDPE/E-NB melt blended resin.

BRIEF DESCRIPTION OF THE DRAWINGS

FIG. 1 illustrates the sample configurations used for tear tests of films described by the Examples hereof.

DETAILED DESCRIPTION OF THE PREFERRED EMBODIMENTS

This invention comprises a melt blend resin of a LLDPE that is readily processible and of sufficient toughness for convenient production into a film layer by a blown bubble extrusion technique. The major polymeric component of the melt blend resin is a LLDPE which comprises greater than 50 wt. % of the melt blend and preferably 70 to 90 wt. % thereof The second component for the melt blend resin is a copolymer of ethylene (E) with norbornene (NB) to the extent that the ethylene-norbornene copolymer (E-NB) has a norbornene content $\geq 10$ mole %, preferably equal to or greater than about 12 mole %, and less than 20 mole %. The LLDPE and the ethylene-norbornene (E-NB) copolymer components are mixed in weight ratio one to another such that the composite material has a content of norbornene which is less than 10 mole % and the blend components are blended under high shear conditions at a temperature greater than the peak melt point temperature of the highest melting component of the blend to form a homogeneous melt blend of the two components.

Incorporation by melt blending of a quantity of an E-NB copolymer of an NB content of from 10 to 20 mole % with an LLDPE in an amount sufficient to impart to the LLDPE/E-NB blend a NB content of from 1 to 10 mole % has been found to provide the melt compounded blend resin with non-linear elongation characteristics. This provides the LLDPE/E-NB blend resin with properties of melt strength and elasticity that permits for fast processing by blown bubble extrusion techniques to a film bubble of excellent bubble stability which is susceptible to fast drawdowns. Further, films formed of the LLDPE/E-NB blend exhibit markedly superior tear resistance properties—both with respect to unnotched and to notched resistance to tear propagation—compared to a comparable film formed of the LLDPE alone.

The LLDPE Blend Component

The LLDPE polymer component for the blend may be any of the LLDPE polymers heretofore described by the art or now commercially available from any producer. Accordingly, the LLDPE polymer component for the blend may be one which is produced from a conventional Ziegler-Natta type catalyst system or, and preferably so, the LLDPE polymer component may be one which is produced with the more recently described metallocene based catalyst systems.

For purposes of this application, preferred LLDPE polymers include ethylene copolymers made utilizing a metallocene catalyst in which ethylene is the major monomeric constituent by weight or mole %; specifically, ethylene comprises at least and preferably more than 94 mole % of the LLDPE polymer while the comonomer content thereof does not exceed 6.0 mole % of the polymer and the comonomer distribution breadth index (CDBI) of the LLDPE polymer exceeds 50%. Preferably such LLDPE polymers comprise at least about 96 mole % ethylene monomeric units and the comonomer content thereof does not exceed 5.0 mole % and more preferably the comonomer content does not exceed about 4 mole % of the polymer. Such metallocene made LLDPE polymers may hereafter be referred to generally as a "m-LLDPE" polymer.

The term LLDPE as used herein shall mean copolymers of ethylene and alpha-olefins. Such alpha-olefins will generally have 3 to 20 carbon atoms. Polymers of ethylene and one or more or these alpha-olefins are contemplated. Preferred alpha-olefins are butene-1, pentene-1, 4-methyl-1-pentene, hexene-1, octene-1 and decene-1. Especially referred are butene-1, hexene-1, and octene-1.

Catalyst for polymerization of the LLDPE here preferred are comprised of a transition metal component having at least one organo ligand which contains a cyclopentadienyl anion moiety through which the organo ligand bondingly coordinates to the transition metal cation. Such catalyst systems are now commonly referred to as "metallocene" (m) catalysts and many examples of such metallocene catalyst systems have now been described in the art.

In contrast to catalyst systems therebefore known for alpha-olefin polymerization that utilize a transitional metal component not having an organo ligand having a cyclopentadienyl anion moiety, now commonly referred to as conventional or traditional Ziegler-Natta (ZN) catalysts, metallocene catalysts are essentially single sited catalysts whereas ZN catalysts are multi-sited catalysts that generally produce a polymer resin having a great diversity of polymeric species. By contrast, an ethylene-alpha-olefin copolymer produced by a metallocene catalyst is generally much more uniform with respect to the polymeric species that comprise the resulting m-LLDPE polymer resin, particularly with respect to the disparity between the differing molecular weight fractions thereof—as indicated by the $M_w/M_n$ value of the m-LLDPE polymer resins generally being $\leq 3.0$—and with respect to the distribution of alpha-olefin comonomer between the different molecular weight fraction thereof—as indicated by a high comonomer distribution breadth index (CDBI) value of 50% and higher. In part, by reason of the greater compositional and molecule weight distribution uniformity achieved in m-LLDPE polymer produced by a metallocene catalyst, the density of the resulting m-LLDPE resins is substantially a linear function of its mole % comonomer content and densities of the LLDPE resin in the 0.910 to 0.940 g/cc range of interest for films of this invention may be accomplished with an ethylene content of greater than 94 mole % and a comonomer content not exceeding about 6.0 mole %, particularly a comonomer content preferably not exceeding about 5.0 mole %, and more preferably of or less than 4 mole %. Further, such densities are achieved in the m-LLDPE resin while the polymer backbone remains substantially linear; that is, such short chain branching (SCB) that occurs along the polymer backbone is due substantially only to the alpha-olefin comonomer content of the polymer. Accordingly, although the final density of the m-LLDPE varies somewhat depending upon the carbon number of the comonomer utilized, the magnitude of this variation with $C_3$–$C_{20}$ alpha-olefin comonomers is not substantial; the requisite copolymer densities required of the m-LLDPE resin for the LLDPE/E-NB melt compounded blend resins of this invention may readily be achieved with low contents of comonomer such as the $C_4$–$C_8$, alpha-olefins, with butene-1 and hexene-1 preferred as the comonomer by reason of their lower cost. Such m-LLDPE polymers having these requisites have recently become commercially available from Exxon Chemical Company in Baytown, Texas and are now identified by the trademark "EXCEED."

The LLDPE polymers of preference for use in the present invention will generally have a narrow molecular weight distribution (MWD), as characterized by the ratio of weight average molecular weight ($M_w$) to number average molecular number ($M_n$), $M_w/M_n$. These $M_w$ and $M_n$ values are determined by Gel Permeation Chromatography (GPC). The MWD for the m-LLDPE of the present invention is less than or equal to 5; preferably $\leq 3.5$, more preferably $\leq 3.0$; and most preferred $\leq 2.5$. Embodiments of these m-LLDPE polymer will have a density preferably in the range of from about 0.915–0.940, preferably 0.917–0.940 and more preferably from 0.920 to 0.940 g/cc.

LLDPE polymers produced from a catalyst system having a single metallocene component have a very narrow composition distribution—most of the polymer molecules will have roughly the same or comparable comonomer mole % content. Ziegler-Natta catalysts, on the other hand generally yield copolymers having considerably broader composition distribution meaning that comonomer inclusion varies widely among the polymer molecules.

A measure of composition distribution is the "Composition Distribution Breadth Index" ("CDBI") as defined in U.S. Pat. No. 5,382,630 which is hereby incorporated by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

Further details of determining the CDBI of a copolymer are known to those skilled in the art. See, for example, PCT Patent Application WO 93/03093, published Feb. 18, 1993. The m-LLDPE polymers employed in the films of this invention have CDBI's equal to or greater than 50% and in the range of 50–98%, usually in the range of 50–70% and most typically in the range of 55–60%.

The m-LLDPE that are preferred resins, have a melt index (MI) in the range of from about 0.5 to about 10, preferably in the range of from about 1.0 to 5.0, and more preferably from 1 to 4.0 dg/min. The MI range for the LLDPE/E-NB melt blended resin for film production via a blown bubble technique is preferably from about 0.8 to about 2.0 dg/min.; for cast film production the MI range of the LLDPE/E-NB melt blended resin is preferably from about 0.75 to 4.0 dg/min.; preferably 1 to 5.0 dg/min.; more preferably 1 to 4 dg/min. Choice of melt index for the LLDPE/E-NB melt blended resin will generally be driven by the type of extrusion process and the specific equipment in use as well as the end use for films and/or subsequent use in converting operations.

The EXCEED™ polymer resin product now available from Exxon Chemical Company is a metallocene catalyst produced ethylene based copolymer. One grade of EXCEED™ is a copolymer of ethylene and hexene-1 and is a linear polymer and a unique type of linear low density polyethylene. This metallocene produced m-LLDPE has a narrow molecular weight distribution ($M_w/M_n$), typically less than 3.0 while having useful weight average molecular weights (Mw) of greater than 10,000 and less than 500,000, and a narrow range of short chain branching (SCB) of about 12 and less than 30 SCB/1000 carbon atoms. The EXCEED™ class of polyethylenes (wherein the comonomer is a $C_4$–$C_8$ alpha-olefin) have a substantial absence of low molecular weight and high comonomer content molecules, a substantial absence of high molecular weight and low comonomer content molecules, as indicated by CDBI≦50%; a narrow molecular weight distribution, and slightly lower melt strength than traditional linear ethylene polymers, and a slightly flatter shear rate viscosity curve.

The Ethylene-Norbornene Copolymer Blend Component

The ethylene-norbornene copolymer which is suitable as a blend component for purposes of this invention may be prepared by copolymerizing ethylene and norbornene in the presence of a catalyst system comprising an activated cyclopentadienyl transition metal compound; namely a metallocene catalyst system. The ethylene-norbornene copolymer is substantially compositionally uniform and incorporates norbornene within the copolymer in an amount from 10 to 30 mole % norbornene, preferably from 10 to 20 mole % norbornene. Preferably, the ethylene-norbornene copolymer has a weight average molecular weight ($M_w$) from about 30,000 to about 1,000,000 and more preferably from about 60,000 to about 300,000 and a molecular weight distribution ($M_w/M_n$) substantially less than about 4, more preferably from about 1.2 to about 2.0. The ethylene-norbornene copolymer is generally amorphous as reflected by the absence of a well-defined melting point by differential scanning calorimetry (DSC) and the substantial absence of a crystalline phase transition. That is, the DSC trace may exhibit a broad hump but generally does not exhibit a sharp-narrow peak as a melting point maximum. The ethylene-norbornene copolymer preferably has a glass transition temperature between −50° C. and +50° C.

Norbornene can generally comprise from about 5 to about 30 mole % of the E-NB copolymer, but preferably comprises from about 10 to about 20 mole %. At lower incorporation rates, the norbornene does not substantially affect the properties of the ethylene based copolymer. Conversely, at higher incorporation rates, the E-NB copolymer would behave too much like the poly(cyclic olefin). Thus, the proportion of norbornene is essential to obtain an E-NB copolymer having the rubbery and memory-retaining properties requisite for use in forming the LLDPE/E-NB melt blended resins of this invention.

The norbornene and ethylene content of the E-NB copolymer are generally targeted to obtain the desired properties of the copolymer. The glass transition temperature ($T_g$), for instance, generally increases as the norbornene content increases since homopolymers of the norbornene generally have a higher $T_g$ than homopolymers of ethylene. The E-NB copolymer preferably has a $T_g$ of from about −50° C. to 50° C., more preferably from about −10° C. to about 30° C. As used herein, $T_g$ is determined by differential scanning calorimetry (DSC) or dynamic mechanical thermal analysis (DMTA) according to procedures well known in the art.

The E-NB copolymers preferred for use in the present invention have a number of properties which make them desirable. The E-NB copolymers generally have good toughness and optical clarity; like homopolymers of ethylene, propylene and higher α-olefins; but also tend to have greater elasticity and recovery after elongation. However, the preferred E-NB copolymers also have toughness and excellent tensile properties. As used herein, ultimate tensile strength, elongation at break, and recovery are determined at 25° C. using procedures in accordance with ASTM D-1708, unless otherwise noted. The E-NB copolymer preferably has an elongation at break of 300% or more, more preferably above 400%, and especially above 500%; a tensile strength at 150% elongation of at least 800 psi, preferably at least 1000 psi; an elastic recovery of at least 75% after 10 minutes relaxation from 150% elongation, more preferably a recovery of at least 85%, and especially 90%. The E-NB copolymer preferably also has an ultimate tensile strength of at least 2500 psi, more preferably above 4000 psi.

The elasticity of the E-NB copolymers can be extended over a relatively broad temperature range by controlling the $M_w$ and MWD. In general, the combination of a higher $M_w$ with a lower MWD tends to result in an E-NB copolymer which remains rubbery at temperatures above the approximate $T_g$ (as measured by DSC or DMTA) of the copolymer, for example, from the $T_g$ (−50° C. to 50° C.) to above 100° C., preferably above 150° C., as reflected by a rubbery storage modulus over this temperature range. To achieve this relatively high use temperature, the $M_w$ of the E-NB copolymer is at least 30,000, preferably at least 60,000, and especially at least 90,000; while the $M_w/M_n$ ratio is less than 2, preferably from 1.2 to 1.8. The rubbery storage modulus of the E-NB copolymer is readily observed as a plateau between about 1 and about 100 MPa by dynamic mechanical thermal analysis (DMTA) at a frequency of 1 or 10 Hz with a 2° C./min temperature ramp using commercially available DMTA equipment, for example, from Polymer Laboratories, Inc.

The polymerization methodology employed to produce an E-NB copolymer as is used in this invention may be practiced in the manner and with metallocene catalysts as referred to, disclosed, and described in the following references U.S. Pat. Nos. 5,055,438; 5,057,475; 5,096,867; 5,017,714; 5,153,157; 5,324,800; 5,198,401; 5,278,119; 5,635,573; and 5,837,787; all of which are hereby incorporated herein by reference.

Generally, the preferred catalyst systems employed in preparing the E-NB copolymer as used in this invention can comprise a complex formed upon admixture of a Group 4 transition metal metallocene component with an activating component. The catalyst system can be prepared by addition of the requisite transition metal and alumoxane components, or a cationically activated transition metal metallocene component, to an inert solvent in which olefin polymerization can be carried out by a solution, slurry or bulk phase polymerization procedure.

Optimum results are generally obtained wherein the Group 4 transition metal compound is present in the polymerization diluent, in a concentration of preferably from about 0.00001 to about 10.0 millimoles/liter of diluent and the activating component is present in an amount to provide a molar activating component to transition metal ratio of from about 0.5:1 to about 2:1 or more, and in the case of alumoxane, the molar alumoxane to transition metal can be high as 20,000:1. Sufficient solvent is normally used so as to provide adequate heat transfer away from the catalyst components during reaction and to permit good mixing.

The catalyst system ingredients, that is, the transition metal, the alumoxane and/or ionizing activators, and polymerization diluent can be added to the reaction vessel rapidly or slowly. The temperature maintained during the contact of the catalyst components can vary widely, such as, for example, from −100° C. to 300° C. Preferably, during formation of the catalyst system, the reaction is maintained within a temperature of from about 25° C. to 140° C., most preferably about 25 to 120° C.

In a preferred procedure for producing the E-NB copolymer, the catalyst system is utilized in the liquid phase (slurry, solution, suspension or bulk phase or combination thereof), high pressure fluid phase or gas phase. The liquid phase process comprises the steps of contacting ethylene and norbornene with the catalyst system in a suitable polymerization diluent and reacting said monomers in the presence of said catalyst system for a time and at a temperature sufficient to produce an E-NB copolymer of sufficient molecular weight. Conditions most preferred for the copolymerization of ethylene are those wherein ethylene is submitted to the reaction zone at pressures of from about 0.019 psi to about 50,000 psi and the reaction temperature is maintained at from about −100° C. to about 300° C. The reaction time may range from about 10 seconds to about 4 hours.

One procedure for polymerization for production of the E-NB copolymer is as follows: in a stirred-tank reactor liquid 2-norbornene is introduced. The catalyst system is introduced via nozzles in either the vapor or liquid phase. Feed ethylene gas is introduced either into the vapor phase of the reactor, or sparged into the liquid phase as is well known in the art. The reactor contains a liquid phase composed substantially of liquid 2-norbornene together with dissolved ethylene gas, and a vapor phase containing vapors of all monomers. The reactor temperature and pressure may be controlled via reflux of vaporizing comonomer (autorefrigeration), as well as by cooling coils, jackets etc. The polymerization rate is generally controlled by the concentration of catalyst. The ethylene and norbornene contents of the polymer product are determined by the ratio of ethylene to norbornene in the reactor, which are controlled by manipulating the relative feed rates of these components to the reactor.

As before noted, any suitable coordination catalyst system can be used. Preferably, however, the catalyst has a relatively low ethylene:norbornene reactivity ratio less than about 300, more preferably less than 100, and especially from about 25 to about 75. Accordingly, the selection of the transition metal component, and other catalyst system components, is a parameter which may be utilized as a control over the ethylene content of the E-NB copolymer with a reasonable ratio of ethylene to norbornene feed rates.

LLDPE/E-NB Blend Formation

As before noted, the LLDPE may comprise as little as 50 wt. % of the blend with the E-NB the balance. However, it is preferred to use a greater quantity of LLDPE component, a quantity sufficient such that the E-NB will in essence become completely comparable with the amorphous phase of the LLDPE component as evidenced by the disappearance of a melting point peak (or hump) in the melt compounded blend that would otherwise be ascribable to the E-NB component. Accordingly, it is preferred to employ the LLDPE component in a quantity that comprises at least about 70 wt. % of the final blend, more preferably in a quantity to provide 75 wt. % of the blend and most preferably such that the LLDPE comprises at least about 80 wt. % of the blend. The balance of the blend polymer components is then the E-NB copolymer and the norbornene content of this E-NB copolymer is selected so that the final blend will have a content of norbornene of from about 1 to about less than 10 mole %, preferably of from about 2 to about 6 mole %.

The final MI of the blend can be varied to a desired range by the selection of LLDPE and E-NB components of differing MI values. Hence, the final blend can be engineered to have the MI value desired for the film formation technique within which the blend will be employed.

Conventional additives, such as antioxidants, Irganox 1076 or Weston 399, and the like can be incorporated with the blend in their typical quantities as desired.

Melt blending is essentially a physical mixing process and, as opposed to a chemical reaction process, the time and temperature conditions of melt blending are not especially critical. With respect to the temperature for melt blending, it is only necessary to employ as a blending temperature one greater than that of the highest melting point peak of the highest melting polymer blend component and less than that temperature at which any blend component would thermally degrade. The blend components, in their molten state, need to be subjected to a high shear mixing only for such length of time as will render the blend components into a relatively uniform mixture, as may be judged by the visual appearance and/or melt flow properties of the molten blend mixture. In this respect, the melt blend can be prepared as an aspect of an article forming extrusion process whereby a pre-mixed dry blend of the LLDPE and E-NB components in appropriate proportions are added to the resin supply hopper of an extruder and melt blending of these components occurs during their screw driven transit through the extruder barrel toward the article forming die gap. Alternatively, the blend components may be pre-melt blended in a static mixer and thereafter chopped to a pellet or other particle form suitable as a dry feed resin material for an extrusion operation.

With respect to the tear resistance properties of a film formed of the LLDPE/E-NB blend resin of this invention, the notched tensile tear strength (NTTS) seems to peak in the region wherein the E-NB component comprises from about 20 to abut 30 wt. % of the blend resin, although the limits of E-NB compatibility with the amorphous phase of the LLDPE component is reached as one approaches the 30 wt. % E-NB loading level. Improvement in Elmendorf Tear Strength is noted and significant throughout the 10 to 50 wt. % E-NB loading region, with peak Elmendorf Tear Strength occurring in the 20 to 50 wt. % E-NB loading region and centering in the 25–30 wt. % E-NB region. This 25–30 wt. % E-NB region is also the center for peak NTTS, hence is a preferred blend composition.

Film Formation From LLDPE/E-NB Blend Resin

Blown films produced with an annular die and air cooling and cast films using a slot die and a chill-roll for cooling are both acceptable techniques for making a film layer of the LLDPE/E-NB melt blended composite resin according to the present invention. Additionally, various additives including pigments, tackifiers, anti-static agents, anti-fogging agents, antioxidants or other additives are also contemplated and may be included in the resins and/or films made therefrom.

Multilayered structures may be preferred in some applications. Such structures include, but are not limited to, coextruded films, and laminated films. Laminated films can include not only one or more film layers based on LLDPE/E-NB melt blended resins of the present invention, but other film layers as well, including but not limited to, polyester, polyamide, polypropylene, other polyethylenes, Saran®, ethylene vinyl alcohol, and the like. Methods of lamination include extrusion lamination, adhesive lamination, heat lamination, and the like.

EXAMPLES

Example 1

Ethylene-Norbornene Copolymerization

Catalyst Activation 4.0 g $Cp_2ZrMe_2$ (0.0159 mole) was weighed out in the dry box and added to 12.0 g N, N-Dimethylanilinium tetraperflurophenyl boron (DMAH $B(pfp)_4$, (0.0150 mole, 1.06:1 molar excess of Zr complex). 2.0 L of dry toluene was added and the mixture allowed to stand with occasional stirring until activation was complete. The resulting solution was transferred to a 2.25 L bomb outfitted with ball valves and sealed for transfer to the reactor.

Reactor Conditions 198 gal. of toluene were transferred to a clean and dry 250 gallon batch reactor. The reactor was scavenged with 3.3 lbs of 25 wt. % solution of Tri isobutyl aluminum (TIBAl) in toluene (1.95 mole). 88.6 lbs. of an 80.7 wt. % norbornene solution in toluene was transferred to the reactor (345.3 mole). Finally, ethylene was introduced under regulated pressure at 38 psig. The mixture was stirred until the solution was saturated with ethylene (~320 mole) and equilibrated at 60° C. The preactivated catalyst solution discussed above was pressured into the reactor in two batches in quick succession until an exotherm occurred. A 3 to 5° C. controlled exotherm occurred after addition of about 62% of catalyst solution (9.3 mmole Zr, Al/Zr=210:1). Temperature was controlled at 60° C. by circulating room temperature cooling oil through the reactor jacket as needed. Ethylene was replenished as needed to maintain 38 psi and the reaction was monitored by ethylene uptake. The reaction was quenched after 2 hours. The resulting copolymer solution was pumped in 10 gal. batches into a precipitating unit filled with hot water. High pressure steam was used to strip solvent and remaining comonomer. After cooling the solid white copolymer was removed, cut into small pieces, ground, extruded through a devolatilization extruder, quenched in ice water and chopped into pellets. The pellets were blown dry with nitrogen. The yield was over 100 lbs. The melt temperature was 63° C. by DSC, MI=1.8 dg/min., Mw=73,000, and 11.8 mole % norbornene incorporation by HNMR.

Example 2

Film Production and Properties

In the following example a series of thin films (3–5 mil thickness) were prepared by molding under compression of 200 psi at 180° C. and various properties of the resulting films were determined. The polymer resins employed in the production of these films were: (A) a LLDPE of ethylene-hexene 10 weight percent having a density of 0.917 $g/cm^3$, a melt index (MI) of 1.0 dg/min., a molecular weight distribution ($M_w/M_n$) of about 2.13 and a first melting point temperature of 120° C. and second temperature of 110° C. (by DSC analysis)—Film A; (B) an E-NB or ethylene-norbornene copolymer of 11.8 mole % norbornene content (31 wt. %) of density 0.950 $g/cm^3$ and MI of 1.2 dg/min. and a $M_w/M_n$ (80,200/43,800) of 1.83 which exhibited by DSC analysis a melting point temperature ($T_m$) of 63° C. and a crystallization temperature ($T_c$) of 40° C., a heat of fusion ($\Delta Hf$) value of 35 J/g and a Young's Modulus (G) of 1966 psi—Film B; and (C) melt compounded blends of the foregoing LLDPE and E-NB copolymer in weight ratios of LLDPE/E-NB of (1) 90/10, (2) 80/20, (3) 70/30 and (4) 50/50 that were prepared by melt blending in a C. W. Brabender (45 $cm^3$) mixer at 150° C./60 rpm for 10 minutes—as Films C1, C2, C3 and C4. Antioxidant Irganox 1076 in an amount of 0.5 gram (1 wt %) was added to all LLDPE/E-NB blends during the mixing process.

All thin film samples were tested for Notched Tensile Tear Strength (NTTS—units; energy/thickness given in lbs.), Elmendorf Tear Strength (g/mil) and were analyzed by DSC for melting point peaks. The results determined are given in Table 1 below.

Tear Strength

Two methods of assessing the tear strength of films were used: the Elmendorf Tear Test and the "Notched Strip Tear Test", which was developed during the course of its investigation. The traditional method is the Elmendorf test, but this was found to be deficient for testing high tear strength films and compression molded samples, so a second method, dubbed the "Notched Tensile Tear Strength" (or NTTS) was developed. The sample configurations used for the tear tests are shown in FIG. 1 with A being for Elmendorf and B being for NTTS. In blown or cast films the initial notch in the sample is made parallel with either the machine or transverse direction. By convention the testing direction is defined as the axis with which the notch is aligned. At the start of the Elmendorf test one sample tab is gripped in a fixed jaw while the other is gripped in a movable jaw attached to a pendulum. When the pendulum is released it swings down, taking the movable grip with it, subjecting the sample to a complex "trouser leg" tear, absorbing energy as it does so. The Elmendorf tear strength (ETS) is reported as the force required to rupture the sample in g/mil. In the NTTS or notched strip test, a 0.5" wide strip has a 0.25" "notch" cut in it with a razor blade, perpendicular to its long axis, which may be parallel or perpendicular to the machine direction. The sample is gripped by jaws set 1.5" apart and subjected to tensile deformation in an Instron tensile testing machine at an elongation rate of 0.5"/min. The tear strength (lbs) is reported as the energy (lb-in) required to rupture the sample divided by its thickness (in). The notched strip tear test (NTTS) has the added advantage that the deformation zone can be directly observed during the course of the test.

TABLE 1

| Film Resin Composition | FILM SAMPLE | | | | | |
|---|---|---|---|---|---|---|
| (wt %) | A | C1 | C2 | C3 | C4 | B |
| LLDPE | 100 | 90 | 80 | 70 | 50 | 0 |
| E-NB | 0 | 10 | 20 | 30 | 50 | 100 |
| FILM PROPERTIES | | | | | | |
| NTTS (lbs.) | 183 | 218 | 222 | 285 | 191 | 325 |
| Elmendorf Tear Strength (g/mil) | 361 | 434 | 477 | 530 | 527 | 502 |
| Melting point Peaks (DSC) ° C. | 120, 110 | 119, 106 | 121, 108 | 119, 107, 66 | 118, 106, 63 | 63 |
| Mole % Monomers in Film Resin | | | | | | |
| Ethylene | 96.43 | 95.73 | 95.00 | 94.25 | 92.68 | 88.2 |
| Hexene | 3.57 | 3.27 | 2.95 | 2.62 | 1.94 | — |
| Norbornene | — | 1.01 | 2.04 | 3.12 | 5.38 | 11.8 |
| Wt. % Monomers In Film Resin | | | | | | |
| Ethylene | 90 | 87.90 | 85.80 | 83.70 | 79.51 | 69.01 |
| Hexene | 10 | 9.0 | 8.0 | 7.0 | 5.0 | — |
| Norbornene | — | 3.10 | 6.20 | 9.30 | 15.50 | 30.99 |
| Film Resin Ea (Kcal/mol) | 6.84 | 7.50 | 7.04 | 7.69 | 9.34 | 10.5 |

Although this invention has been described by reference to its preferred embodiments, upon reading this disclosure, those of skill in the art may appreciate changes and modifications that can be made which do not depart from the scope and spirit of this invention as described above or claimed hereafter.

What is claimed is:

1. A composition for fabrication of a film having improved mechanical properties comprising; a melt blended resin, consisting essentially of
   a) from 50–90 wt. % of an LLDPE formed of acyclic olefin monomers;
   b) from 50–10 wt. % of an ethylene-norbornene copolymer having a norbornene content of at least 10 mole % and a $T_g$ less than 60° C.;
   wherein said LLDPE and ethylene-norbornene copolymer components are present in proportion with respect one to another to yield a composite having a norbornene content $\leq 1$ mole % and $\leq 10$ mole % and said components are melt blended under high shear to yield a melt blend.

2. The composition of claim 1, wherein the LLDPE comprises from 70 to 90 wt. % and the E-NB copolymer comprises from 30 to 10 wt. %.

3. The composition of claim 2, wherein the E-NB copolymer has a norbornene content of less than 20 mole % and the blend has a norbornene content 2 to 6 mole %.

4. The composition of claim 3, wherein the E-NB copolymer comprises from 20 to 30 wt. % of the blend.

5. The composition of claim 2, wherein the melt blend exhibits by DSC melting point peaks ascribable only to the LLDPE.

6. A film, comprising: a film layer composed of a melt blended resin consisting essentially of
   a) from 50–90 wt. % of an LLDPE formed of acyclic olefin monomers;
   b) from 50–10 wt. % of an ethylene-norbornene copolymer having a norbornene content of at least 10 mole % and a $T_g$ less than 60° C.;
   wherein said LLDPE and ethylene-norbornene copolymer components are present in proportion with respect one to another to yield a blend having a norbornene content $\leq 1$ mole % and $\leq 10$ mole %.

7. The film of claim 6, wherein the LLDPE comprises from 70 to 90 wt. % and the E-NB copolymer comprises from 30 to 10 wt. %.

8. The film of claim 7, wherein the E-NB copolymer has a norbornene content of less than 20 mole % and the blend has a norbornene content 2 to 6 mole %.

9. The film of claim 8, wherein the E-NB copolymer comprises from 20 to 30 wt. % of the blend.

10. The film of claim 7, wherein the melt blend exhibits by DSC melting point peaks ascribable only to the LLDPE.

11. The film of claim 7, wherein said film has a NTTS greater than an otherwise comparable film formed only of the LLDPE alone.

12. The film of claim 11, wherein the NTTS of the film is greater than a mathematically weighted average of a contribution to NTTS that is represented by the weight percent proportions of the LLDPE and E-NB in sum.

13. The film of claim 11, wherein said film has an Elmendorf Tear Strength (ETS) which is greater than a mathematically weighted average of a contribution to ETS that is represented by the weight percent proportions of the LLDPE and E-NB in sum.

* * * * *